United States Patent
Rosenbluth et al.

(10) Patent No.: US 7,730,494 B1
(45) Date of Patent: Jun. 1, 2010

(54) METHODS AND APPARATUS FOR SERVICE AND NETWORK MANAGEMENT EVENT CORRELATION

(75) Inventors: Joshua H. Rosenbluth, Middletown, NJ (US); Joseph Vassallo, Red Bank, NJ (US); Silvano Valle, Staten Island, NY (US); Atul Vohra, Princeton, NJ (US); Robert S. Bateman, South Plainfield, NJ (US)

(73) Assignee: AT&T Corp., New York, NY (US)

( * ) Notice: Subject to any disclaimer, the term of this patent is extended or adjusted under 35 U.S.C. 154(b) by 1381 days.

(21) Appl. No.: 11/110,417

(22) Filed: Apr. 20, 2005

(51) Int. Cl.
*G06F 9/00* (2006.01)
*G06F 11/00* (2006.01)

(52) U.S. Cl. ........................ 719/318; 714/39
(58) Field of Classification Search ................ 719/310, 719/318; 714/39, 48, 57
See application file for complete search history.

(56) References Cited

U.S. PATENT DOCUMENTS

| | | | |
|---|---|---|---|
| 6,147,975 A * | 11/2000 | Bowman-Amuah | 370/252 |
| 6,336,139 B1 * | 1/2002 | Feridun et al. | 709/224 |
| 6,445,774 B1 * | 9/2002 | Kidder et al. | 379/9.03 |
| 6,446,136 B1 * | 9/2002 | Pohlmann et al. | 719/318 |
| 6,553,403 B1 * | 4/2003 | Jarriel et al. | 709/202 |
| 7,428,723 B2 * | 9/2008 | Greene et al. | 717/103 |
| 2003/0005090 A1 * | 1/2003 | Sullivan et al. | 709/220 |
| 2003/0074440 A1 * | 4/2003 | Grabarnik et al. | 709/224 |
| 2003/0200486 A1 * | 10/2003 | Marwaha | 714/39 |

OTHER PUBLICATIONS

Burns et al. "Towards Discovery of Event Correlation Rules", 2001 IEEE, pp. 345-359.*
Mansouri-Samani et al. "A Configurable Event Service for Distributed Systems", 1996 IEEE, pp. 210-217.*
Park "Event Correlation", 2001 IEEE, pp. 34-35.*

* cited by examiner

*Primary Examiner*—Van H Nguyen

(57) ABSTRACT

Service and network management events are correlated, enabling a user to correlate all the application and network events that stem from a common fault without requiring repeated and exhaustive capturing of detailed knowledge of the network assets, the topological relationships and all possible events.

15 Claims, 5 Drawing Sheets

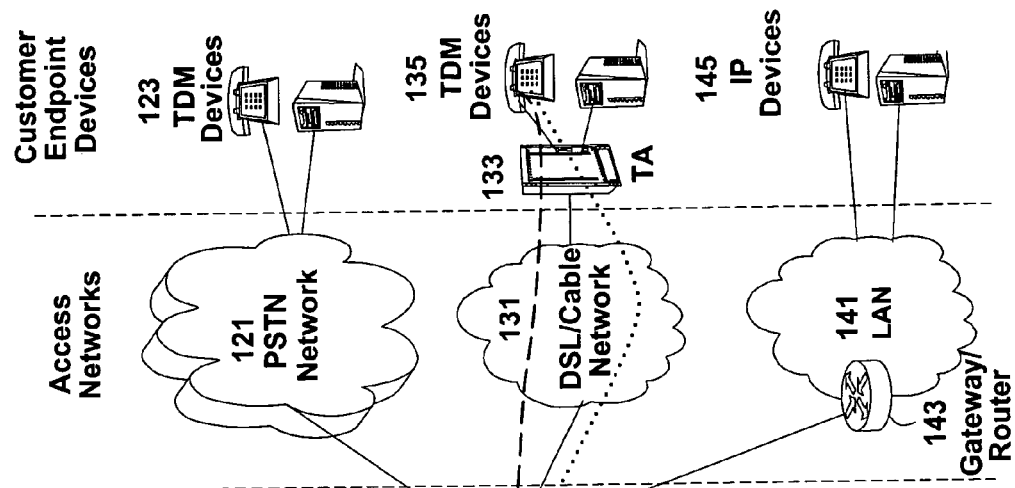
FIG. 1
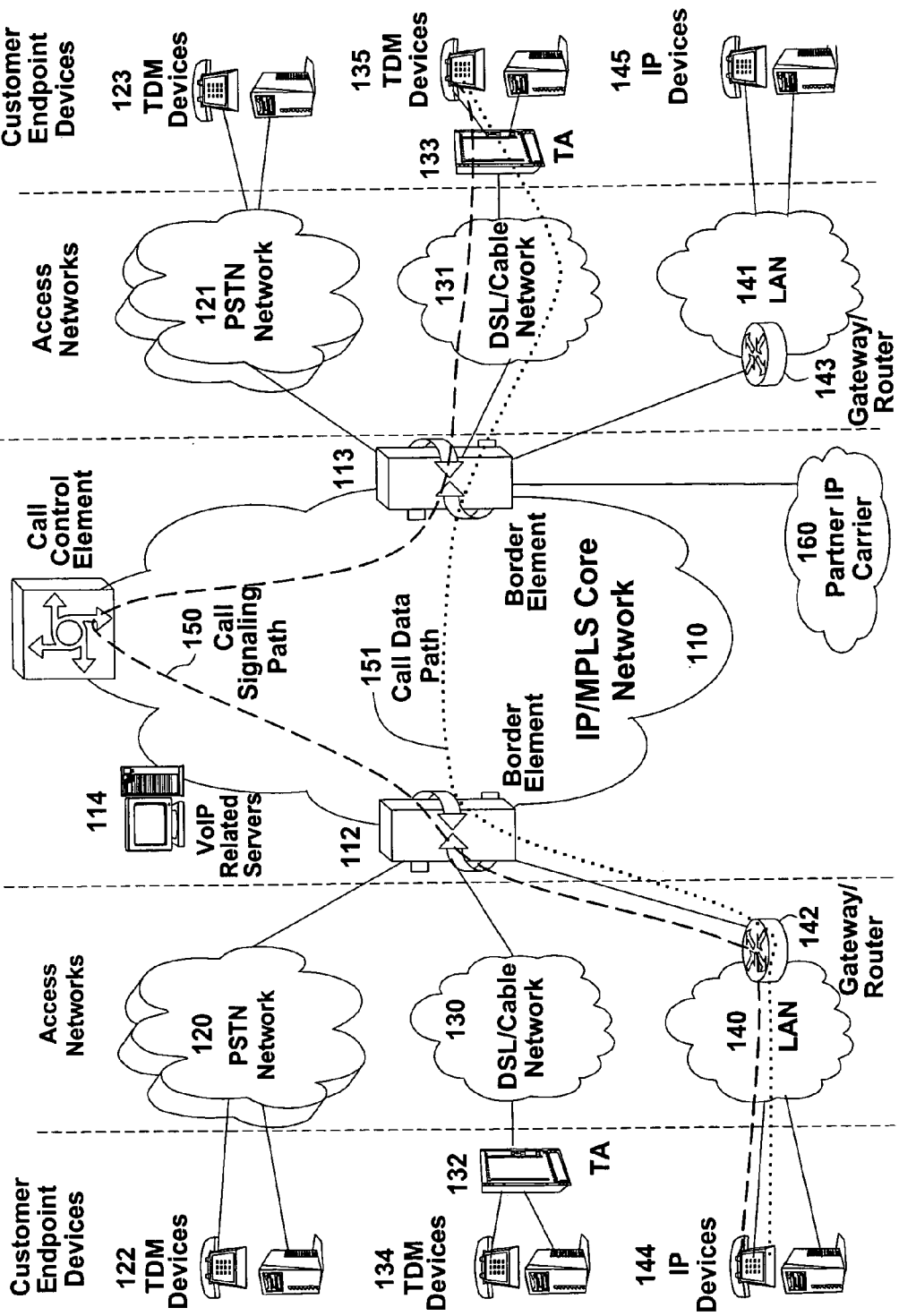

METHODS AND APPARATUS FOR SERVICE AND NETWORK MANAGEMENT EVENT CORRELATION

The present invention relates generally to communication networks and, more particularly, to a method and apparatus for service and network management event correlation.

BACKGROUND OF THE INVENTION

The communications infrastructure is a critical component of any economy. All of today's important scientific, business and consumer applications rely on the telecommunications infrastructure. Since internet services are becoming ubiquitous, more and more businesses and consumers are relying on their internet connections for both voice and data transport needs. The amount of traffic transported on the network continues to grow. Each component of the network is shared by a large number of businesses and consumers. Thus, when network events happen, a significant amount of traffic is impacted. Often a single trouble produces multiple failure events. Network managers review the trouble tickets for route cause analysis. It is very important to identify the related events and remedy the situation as quickly as possible. Traditional event correlation methods require the network provider to define each possible network event, to register each network asset and to establish all the network specific topological relationships. The correlation rules must be defined for every connected asset, which is very time consuming as the size of the network increases.

Thus, there is a need for a method for event correlation that does not depend on repeated and exhaustive capturing of detailed knowledge of each asset in each correlation rule, a complete knowledge of all the possible events, and correlation rules for specific network topologies.

SUMMARY OF THE INVENTION

In one embodiment, the present invention discloses a method and apparatus for correlating network events. The method combines multiple events that stem from a common fault, as defined by the user, into a single event, e.g., without requiring repeated and exhaustive capturing of the complete knowledge of the network assets, all possible events and topological relationships. In one embodiment, the present invention may additionally provide a method to create a single trouble ticket for the common fault. In one embodiment, the present invention may also provide a method to correlate network and application events. By quickly identifying a common fault, the present invention will reduce network outage intervals and the amount of resources that need to be allocated for trouble isolation.

BRIEF DESCRIPTION OF THE DRAWINGS

The teaching of the present invention can be readily understood by considering the following detailed description in conjunction with the accompanying drawings, in which:

FIG. 1 illustrates an exemplary network related to the present invention;

To facilitate understanding, identical reference numerals have been used, where possible, to designate identical elements that are common to the figures.

DETAILED DESCRIPTION

Figure 2:
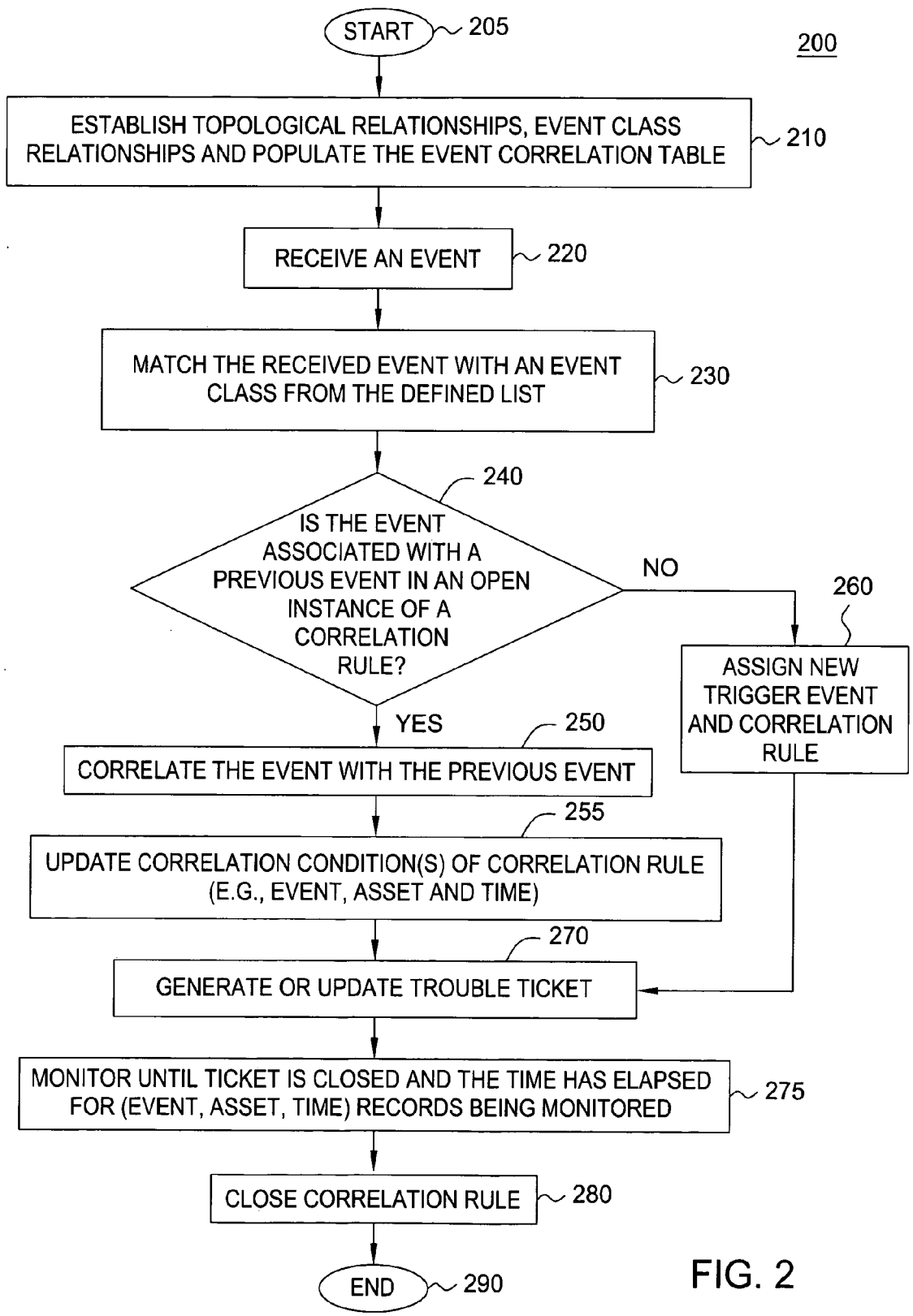
FIG. 2 illustrates a flowchart of a method for correlating events in accordance with the present invention.

The present invention broadly discloses a method and apparatus for service and network management event correlation. Although the present invention is discussed below in the context of telecommunication networks, the present invention is not so limited. Namely, the present invention can be applied for any trouble isolation function such as used in computer networks, epidemiology studies, etc. For the purpose of scope, the term packet is intended to broadly include a record.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Element (BE) 112 and 113, the Call Control Element (CCE) 111, and VoIP related servers

114. The BE resides at the edge of the VoIP core infrastructure and interfaces with customers endpoints over various types of access networks.

In order to illustrate how the different components operate to support a VoIP call, the following call scenario is used to illustrate how a VoIP call is setup between two customer endpoints. A customer using IP device 144 at location A places a call to another customer at location Z using TDM device 135. Note that a customer in location A using any endpoint device type with its associated access network type has to be able to communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for media format conversion, such as TDM voice format to and from IP based packet voice format.

The above VoIP network is described to provide an illustrative environment in which the packets may traverse throughout the entire network. The present invention is not limited to this architecture. Often a single trouble affects several customers and produces multiple failure events. Event correlation methods that depend on repeated and exhaustive capturing of the complete knowledge of the entire network assets for each correlation rule, all the topological combinations and all possible events are not practical. Thus, network managers often don't use event correlation because it is labor intensive. As a result, application and network events are dealt with separately, thereby substantially increasing the amount of events that must be analyzed and delaying the ability to quickly trouble shoot a problem to a root cause. Therefore, it is advantageous to be able to identify related network and/or application events to remedy the situation as soon as possible. The present invention allows combining the network and application events and results in reduction of outage times.

In one embodiment, the event correlation method combines multiple events that stem from a common fault, as defined by the user, into a single event and at the option of the user, generate a single trouble ticket for the common fault. In brief, the event correlation method comprises the steps of:

Specifying the topological relationships between assets;
Defining groups of events into event classes;
Defining correlation rules;
Executing the correlation rules to combine related events into a single event; and
Optionally, generating trouble tickets for the faults.

The topological relationships between assets in the network are initially established and stored in a topological database. In one embodiment, there are two types of topological relationships:

CONTAINS/CONTAINED-BY; and
CONNECTED-TO.

An asset that has components CONTAINS those components. The components are CONTAINED-BY the asset. CONTAINS/CONTAINED-BY relationships are determined based on the current asset database without requiring any additional user input. It should be noted that the present invention is not limited by these two relationships, other relationships can employed depending on the assets or the relationships of the deployed assets, e.g., hierarchical relationships, relationships based on the number of hops, and so on.

In one embodiment, the CONNECTED-TO relationships are determined when a circuit or a service is established. The user needs to input the relationship information only once (except for modifications). It should be noted that the CONNECTED-TO relationships can describe a physical and/or logical relationship between two assets. The CONNECTED-TO relationships are used in determining which events are correlated. Therefore, care must be taken when establishing the relationships.

Figure 4:
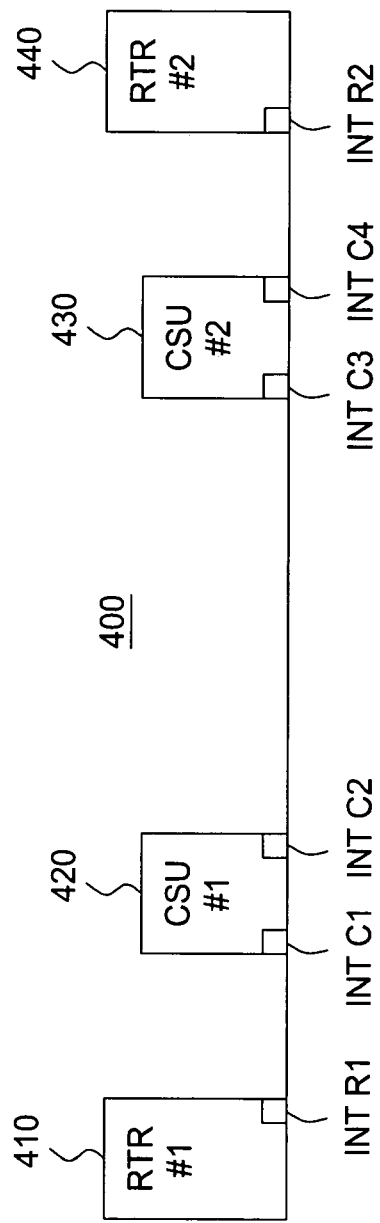
FIG. 4 illustrates an exemplary network architecture.

FIG. 4 illustrates an exemplary network architecture 400. This simplified architecture illustrates four components: a first router 410, a first channel service unit 420, a second channel service unit 430, and a second router 440. Each of the routers contains one interface (e.g., INT R1 and INT R2) and each of the second channel service units contains two interfaces (e.g., (INT C1, INT C2) and (INT C3, INT C4)). In building the topological database of the architecture of FIG. 4, the following relationships can be inferred without any user input:

RTR #1 CONTAINS INT R1
INT R1 is CONTAINED-BY RTR #1
INT C1 is CONTAINED-BY CSU #1
CSU #1 CONTAINS INT C1
CSU #1 CONTAINS INT C2
INT C2 is CONTAINED-BY CSU#1
INT C3 is CONTAINED-BY CSU #2
CSU #2 CONTAINS INT C3
CSU #2 CONTAINS INT C4
INT C4 is CONTAINED-BY CSU#2
INT R2 is CONTAINED-BY RTR #2
RTR #2 CONTAINS INT R2.

In turn, the following topological relationships can be entered by a user (or also inferred from a template without requiring user input):

INT R1 is CONNECTED-TO INT C1
INT R1 is CONNECTED-TO INT R2
INT C1 is CONNECTED-TO INT R1
INT C1 is CONNECTED-TO INT C2
INT C2 is CONNECTED-TO INT C1
INT C2 is CONNECTED-TO INT C3
INT C3 is CONNECTED-TO INT C2
INT C3 is CONNECTED-TO INT C4
INT C4 is CONNECTED-TO INT C3
INT C4 is CONNECTED-TO INT R2
INT R2 is CONNECTED-TO INT C4
INT R2 is CONNECTED-TO INT R1.

Thus, the present invention allows the topological database to be quickly generated without having to laboriously define the details of the network topology in each correlation rule. The user can simply draw connections between the network components and/or place one network component within another network component. The method can be automated such that the exemplary architecture of FIG. 4 can be analyzed to generate the above relationships automatically.

In one embodiment, the present method provides a template of some services and circuits that are connected to each other. For example, if the user wants to correlate events between a server running an application and another server hosting a database the application accesses, the user needs to establish the relationship that "a server that is an application asset is CONNECTED-TO a server that is a database asset."

Figure 5:
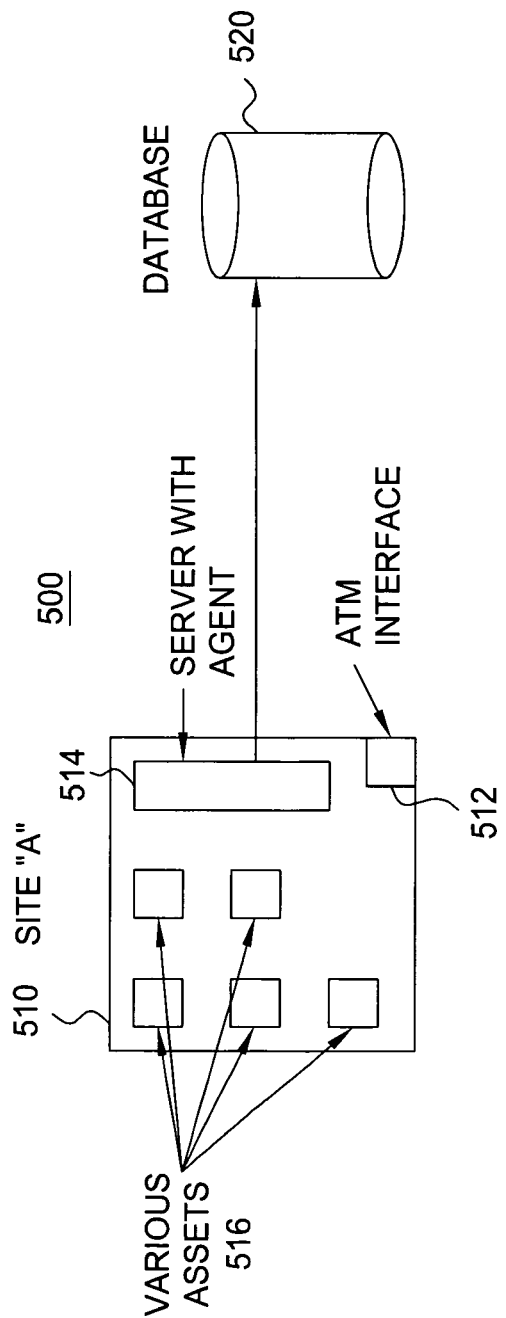
FIG. 5 illustrates another exemplary network architecture.

To illustrate, FIG. 5 illustrates another exemplary network architecture 500. This simplified architecture illustrates two components: a site A component 510, and a database 520. The Site A component may comprise an ATM interface 512, a server, e.g., a server with an agent (e.g., a generic agent application), and a plurality of various assets 516. In one embodiment, a component, e.g., a remote network management application (not shown) may ping the assets 516 at Site A with all traffic passing through the ATM Interface 512. If an asset does not respond, an event can be created by the remote network management application. If there is a network failure which makes Site A completely unreachable, then all pings will fail and the multiple events should be correlated. Additionally, the Server with the agent 514 may push data to a database 520 not located at Site A. When there is no valid data in the database, an event can be created by the remote network management application. Thus, if the Server with the agent 514 is either unreachable or down, those events should be correlated with events from the Database that signal that data is missing. As such, FIG. 5 illustrates another example of the CONNECTED-TO relationship. Namely, the application server can be logically CONNECTED-TO a database, i.e., server 514 is logically CONNECTED-TO the database 520.

Once the topological database is specified, the present method then builds the event class database. The event class database can be determined at service establishment, e.g., only once. In one embodiment, the present method provides default sets of event classes that can be used. Although the present method enables the user to redefine the CONNECTED-TO relationships and the event classes at any time, an action is generally needed only when the service is initialized.

When both the topological database and event class database are ready, the present method builds an event correlation table. The table contains the correlation rules that determine the events that will be correlated. Unlike the topology and event class databases that are input only at service establishment, the event correlation rules are input whenever the user wants to establish the rule.

In one illustrative embodiment, the present method provides a correlation table that includes a Trigger Event, a Correlated Event, a Topological Constraint and a Time Constraint. The Trigger Event and the Correlated Event are specific event classes. The correlation is made if the topological and time constrains are met.

In order to illustrate the present method, Table 1 predefines the following 4 illustrative event classes:
Router physical fault;
Router interface fault;
Server application failure; and
Server database fault.

It should be noted that the present invention is not limited to these four specific event classes. Event classes are application specific and can be defined in accordance with a particular application.

TABLE 1

| Trigger Event | Correlated Event | Topological Constraint | Time Constraint |
|---|---|---|---|
| Router physical fault | Router interface fault | CONTAINED-BY | 60 Seconds |
| Server application failure | Server database fault | CONNECTED-TO | 120 Seconds |

In the above example, there are four pre-defined event classes: Router/Physical Fault, Router:Interface Fault, Server:Application Failure and Server:Database Fault. The first event class may include events such as power, temperature or DSP alarms from a router. The second event class may include events such as Linkdown alarms from a router interface. The third event class may include events such as timeouts in trying to reach a database from an application. The fourth event class may include events such as an unable to read error from a database.

As shown in Table 1, the Trigger Event and the Correlated Event are specific event classes from the predefined list. In each row, the event correlator looks for the Correlated Event after it receives the Trigger Event provided that both the topological and time constraints are met. Therefore, the Trigger and Correlated events in the first row of Table 1 are correlated only when the asset that created the Correlated Event is CONTAINED-BY the asset that created the Trigger Event. In the second row, the two events are correlated only when the asset that created the Correlated Event is CONNECTED-TO the asset that created the Trigger Event. In both cases, the event is correlated only if it arrives within the time constraint after the Trigger Event.

For example, if the VoIP related server 114 in FIG. 1 fails, alarms may be received from the failed node, the adjacent nodes and any other network elements accessing 114. The event correlation table is used to combine multiple events from different assets into a single correlated event/trouble ticket, thereby assisting a network manager in lowering the time it takes to identify the root cause and to remedy the situation.

Note that the Event Correlation Table, such as illustrated in Table 1, does not specify which asset is affected. There is no need to identify any specific asset or the actual topology. The specification is generic. The Trigger Event can be received from any asset in the network architecture. The Event Correlator uses the topological constraint and database to determine the subsequent events to be correlated to the trigger event. Additionally, the Event Correlation Table does not define what comprises an event to be correlated beyond that it belongs to the specified "event class". This is a unique approach since it does not require each correlation rule to precisely characterize which events will be correlated, e.g., typically by defining that when fields X, Y and Z in an event have values A, B and C, it should be correlated and so on.

The user specifies one or more of the trigger events that will comprise a single correlation rule (e.g., one or more rows in Table 1 can be a correlation rule) and provide a name for the rule. The method enables the user to specify whether the correlation rule produces a trouble ticket or not.

In the event correlation table, there are additional sets of entries that are added even though the user does not provide additional input. These entries are called "mirror image entries." The mirror image entries are generated by the method by switching the trigger and correlated events because the events could occur in either order. This is because network related problems such as congestion may prevent the events from being received in a timely manner in the order they occurred.

Table 2 illustrates the mirror image entries for the events in Table 1. The topological constraint for the mirror image entry is CONTAINS if the original entry was CONTAINED-BY. The topological constraint for the mirror image entry is CONTAINED-BY if the original entry was CONTAINS. The topological constraint is CONNECTED-TO if the original entry was CONNECTED-TO. The time constraint in the mirror image entry is the same as the original entry.

TABLE 2

| Trigger Event | Correlated Event | Topological Constraint | Time Constraint |
|---|---|---|---|
| Router interface fault | Router physical fault | CONTAINS | 60 Seconds |
| Server database fault | Server application failure | CONNECTED-TO | 120 Seconds |

To illustrate the present invention, Table 3 is provided as one possible correlation rule associated with FIG. 4. A sequence of exemplary events will now be described as an example to explain the present invention.

TABLE 3

| Trigger Event | Correlated Event | Topological Constraint | Time Constraint |
|---|---|---|---|
| Router/Physical | Router:Interface/Fault | CONTAINED-BY | 60 seconds |
| Router:Interface/Fault | CSU:Interface/Fault | CONNECTED-TO | 90 seconds |
| | Router:Interface/Fault | CONNECTED-TO | 120 seconds |
| | Router:Physical | CONTAINS | 60 seconds |
| CSU/Physical | CSU:Interface/Fault | CONTAINED-BY | 60 seconds |
| CSU:Interface/Fault | CSU:Interface/Fault | CONNECTED-TO | 90 seconds |
| | Router:Interface/Fault | CONNECTED-TO | 90 seconds |
| | CSU/Physical | CONTAINS | 60 seconds |

The eight entries in the Event Correlation table 3 are the Correlation Rule (which the user may specify by name) and completely describe the logic by which the present invention will decide which events are to be correlated. These entries are merely an exemplary guess at the logical relationships. It is possible that the above specification is either incomplete or includes entries that do not belong. In all cases, the user has control over the logic through the table and can change it as necessary.

Assume that a first event received is a Router/Physical event from RTR #1 at time T=0. This event is treated as a new Trigger Event and opens an instance of the Correlation Rule. There is only one row in the Event Correlation Table with a Router/Physical Trigger Event. Thus, the present invention uses that single row to develop one or more potential correlation conditions, e.g., correlation triplicates. In one embodiment, a correlation triplicate may comprise three entries or fields: 1) a specific asset, 2) an event class, and 3) a timer value. In operation, a Trigger Event creates one or more triplicates based on the Event Correlation Table. A subsequent event from a specific asset will be correlated with the Trigger Event if there is a triplicate whose: 1) asset matches the asset that produced the subsequent event, 2) event class contains the subsequent event, and 3) timer value is greater than zero. For example, the present invention is looking for Router:Interface/Fault events from an asset that is CONTAINED-BY RTR #1 within 60 seconds. The only triplicate that meets those conditions is [Router:Interface/Fault, INT R1, T=60].

If 60 seconds pass and no event has occurred, T is set to 0. If there is no open trouble ticket, correlation stops and the Correlation Rule is closed. If there is an open trouble ticket, the Rule is still open and any subsequent Router/Physical event from RTR #1 (a repeat of the Trigger Event) will be correlated.

If instead at T=40, the present invention sees a Router: Interface/Fault from INT R1, the present invention concludes from the Correlation Rule that this event will be correlated with the Router/Physical event. The present invention treats the new event as a Trigger Event and forms the following triplicates:

[CSU:Interface/Fault, INT C1, T=90]
[Router:Interface/Fault, INT R2, T=120]
[Router/Physical, RTR #1, T=60]

Additionally, the present invention has the leftover triplicate [Router:Interface/Fault, INT R1, T=20]. Note that T is now 20 because 40 seconds has expired since the original event.

Thus, if an event matches any one of the four triplicates, it will be correlated with the two existing events. Let's say 20 seconds has elapsed without another event occurring. The triplicate [Router:Interface/Fault, INT R1, T=0] is deleted, leaving the following:

[CSU:Interface/Fault, INT C1, T=70]
[Router:Interface/Fault, INT R2, T=100]
[Router/Physical, RTR #1, T=40]

Note the times have all been reduced by the 20 seconds that elapsed. 10 more seconds after that the present invention sees a linkdown event on INT R2. That event matches one of our triplicates and is hence correlated. The present invention now has a new Trigger Event with the following triplicates

[CSU:Interface/Fault, INT C4, T=90]
[Router:Interface/Fault, INT R1, T=120]
[Router/Physical, RTR #2, T=60].

The present invention also adds the following leftover triplicates:

[CSU:Interface/Fault, INT C1, T=60]
[Router:Interface/Fault, INT R2, T=90]
[Router/Physical, RTR #1, T=30]

Thus the present invention has six triplicates in the new Correlation Rule. Let's say 30 seconds pass with no other event. The present invention deletes the [Router/Physical, RTR #1, T=0] triplicate (and reduces the times for all the other triplicates by 30 seconds). But, 10 seconds later another Router/Physical event from RTR #1 occurs. This event does not meet any of our triplicates. But, because it matches an event that has already been correlated with an open Correlation Rule, the present invention correlates the event and treats it as a Trigger Event. The present invention ends up with the following triplicates:

[Router:Interface/Fault, INT R1, T=120]
[CSU:Interface/Fault, INT C4, T=50]
[Router/Physical, RTR #2, T=20]
[CSU:Interface/Fault, INT C1, T=20]
[Router:Interface/Fault, INT R2, T=50]

Note that only [Router:Interface/Fault, INT R1, T=120] comes from the new Trigger Event. All the other triplicates are leftovers. Additionally, [Router:Interface/Fault, INT R1, T=80] is also leftover. However, that overlaps with [Router: Interface/Fault, INT R1, T=120] and the present invention only includes the triplicate with the greater time.

The present invention completes this first sequence by noting that if an event from INT C1 is seen, the present method can then correlate events from CSU #1 and INT C2. Similarly, if the method sees an event from INT C4, the method can correlate events from CSU#2 and INT C3. Or if the method sees an event from INT C2 after an event from INT C1, the method can correlate an event from INT C3. In essence, the present invention is tracking these events as they cascade through the network in any number of logical sequences that are inferred from the Event Correlation table.

The present invention will now be described from the perspective of a flowchart. FIG. 2 illustrates a flowchart of a method 200 for correlating events.

Method 200 starts in step 205 and proceeds to step 210. In step 210, method 200 establishes the topological relationships from the existing asset records. It also group events into different event classes. For example, temperature related and power related events could all be grouped into an event class for physical or environmental faults. The event correlation table is then populated with the rules. For example, interface failures on a router that already has a reported event can be correlated back to the router event. The method then proceeds to step 220.

In step 220, method 200 starts receiving events.

In step 230, method 200 matches the received events to an event class defined in step 210. For the example described above, the event class would be the Physical/environmental faults.

In step 240, method 200 determines whether the new event is associated with a previous event in an open instance of a correlation rule. It should be noted that an open instance of a correlation rule may exist, e.g., an open or outstanding triplicate may exist for a correlation rule.

In one embodiment, depending on the user's preference, a partial match can be optionally correlated. For example, if an event is received for a router and there is a match of the event class and the asset but not the time, the user can correlate the event to the previous occurrence even if the time of the first event has expired. If the event is associated with a previous occurrence, the method proceeds to step 250. Otherwise, it proceeds to step 260.

In step 250, method 200 correlates the new event to the trigger event and proceeds to step 255 to update one or more correlation conditions, e.g., triplicates of the pertinent correlation rule(s).

In step 255, one or more correlation conditions, e.g., triplicates, of the pertinent correlation rules are updated. The new record can be appended to the previous record or the new one can replace the previous record depending on the application and user preference. The method then proceeds to step 270 to update the trouble ticket.

In step 240, if no match was found, method 200 proceeded to step 260. In step 260, a new trigger event is assigned and a new instance of a correlation rule is opened. Then, method 200 proceeds to step 270 to generate a new ticket.

In step 270, the method generates or updates the trouble ticket automatically. Note that the user specifies the events that result in a trouble ticket in a separate process, e.g., the user may specify that all events from a given correlation rule either get a ticket or not.

In step 275, the method monitors until the tickets are closed. When the tickets are closed and there are no records left to monitor, the method proceeds to step 280 to close the rule.

In step 280, the method closes the rule.

Method 200 ends in step 290.

Figure 3:
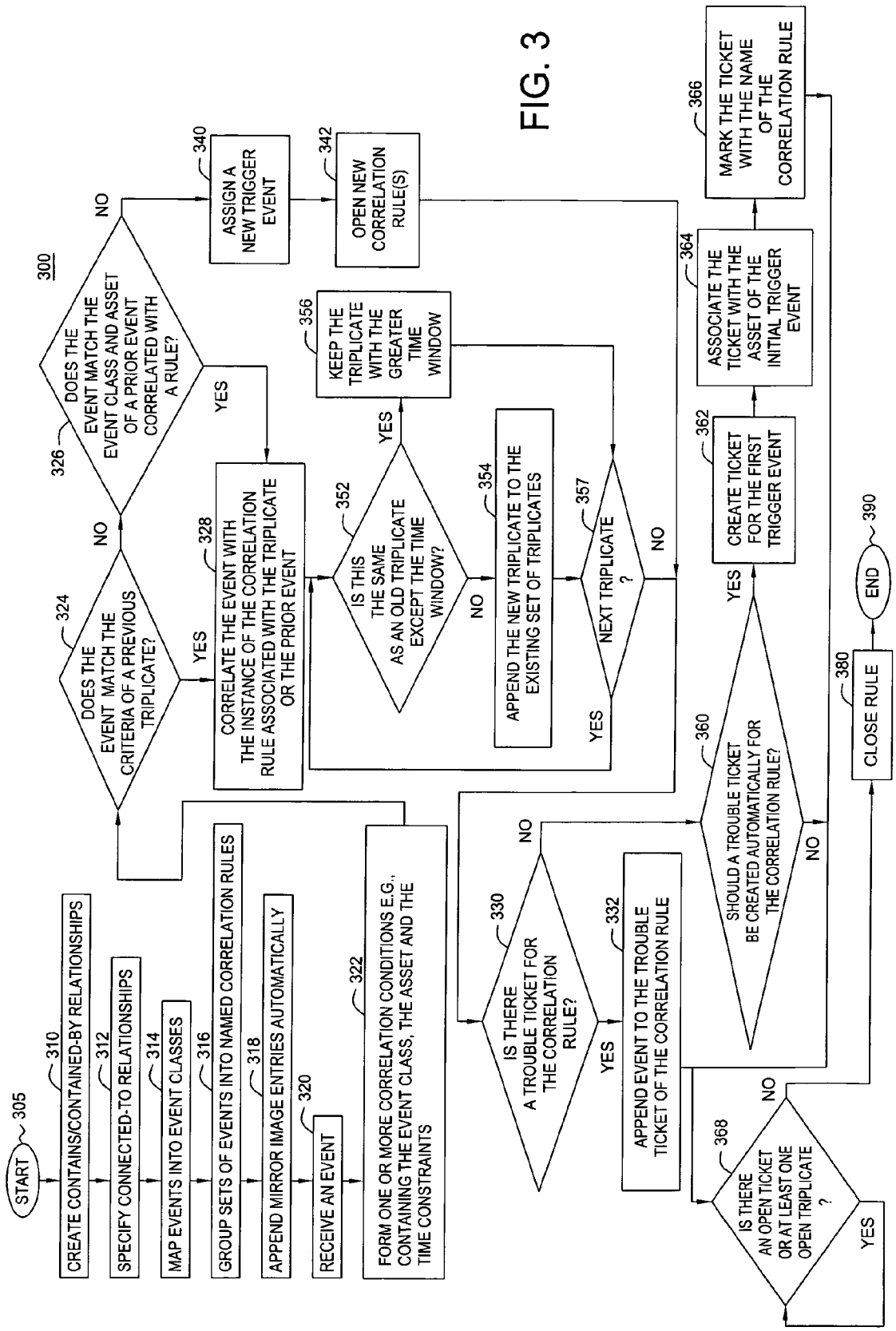
FIG. 3 illustrates a detail flowchart of a method for correlating events in accordance with the present invention.

FIG. 3 provides a detailed flowchart of the method for correlating events described above. The method 300 is described without requiring repeated and exhaustive capturing of the complete knowledge of network assets, topological relationships and all possible event scenarios.

Method 300 starts in step 305 and proceeds to step 310.

In step 310, method 300 automatically creates CONTAINS and CONTAINED-BY topological relationships based on the asset database. This step does not require the user to input new information. The existing database is used. When new assets are acquired, the database can be updated without affecting the topological relationships.

In step 312, method 300 specifies which assets are CONNECTED-TO which other assets. This information is critical in determining the events that should be correlated. In one embodiment, the current invention includes default CONNECTED-TO relationships. The user can modify the content at anytime.

In step 314, method 300 maps events into event classes. Each event can be a member of only one event class. For example, power failures, temperature alarms etc. can all belong in a "Router physical failure" event class. The user determines the events that belong in the same class by considering the actions that must be taken to remedy the situation, to prioritize work, to assign resources etc.

In one embodiment, the current invention provides default event classes to be considered by the user. Examples of these default event classes are physical failures, interface failures, application failures, database failures etc.

In step 316, method 300 provides the user an ability to input correlation rules. The user groups sets of events from the event correlation table entries into named correlation rules. For example, a router physical failure and a router interface failure can be correlated if they meet the topological and time constraints. The user enters the trigger event, correlated event, the topological constraint and the time constraint.

In step 318, method 300 automatically appends mirror image entries. If the mirror image entry is identical to the original entry, the corresponding mirror image entry is not entered.

In step 320, method 300 receives an event and proceeds to step 322.

In step 322, method 300 forms one or more correlation conditions, e.g., triplicates, using the correlation rule. In one embodiment each triplicate formed contains an event class, an asset and a time constraint.

In step 324, method 300 verifies whether the event meets the criteria of a previous triplicate. If it does not meet the criteria, it proceeds to step 326 to see if the event matches the event class and asset of a prior event correlated with an open correlation rule. If the event meets the criteria of a previous triplicate, the method proceeds to step 328 to correlate the event with the instance of the correlation rule associated with the previous triplicate.

In step 326, method 300 verifies whether the event matches the event class and asset of a prior event that has been correlated with an open correlation rule. If it does, the method proceeds to step 328 to correlate the event with the previous correlation rule even if there is no triplicate. Otherwise, the method proceeds to step 340 and assigns the event as a new trigger event.

In step 328, method 300 correlates the event with the instance of the correlation rule associated with either the triplicate (e.g., if the answer was "yes" in step 324) or prior event without a triplicate (e.g., if the answer was "yes" in step 326) and proceeds to step 352.

In step 352, method 300 determines, for the first triplicate created in step 322, whether the triplicate is the same as an old triplicate except for the time window. If it is, the method retains the triplicate with the greater of the two time windows in step 356. If it is not the same as an old triplicate, the method proceeds to step 354 and appends the new triplicate to the existing set of triplicates. In either case, the method proceeds to step 357 to determine whether a next triplicate was created in step 322. Namely, an event may cause one or more triplicates to be formed in step 322 and each triplicate must be analyzed in step 352. If there is a next triplicate, then method 300 returns to step 352. Otherwise, Method 300 proceeds to step 330.

In steps 324 and 326 method 300 determined if the event met the criteria of a previous triplicate or matched the event class and asset of a prior event respectively. If neither the triplicate criteria are met nor the match exists, a new trigger event is assigned in step 340. The method then proceeds to step 342.

In step 342, method 300 opens new correlation rules for the new trigger events.

Now, all the correlation rules are assigned and the triplicates are updated. In step 330, method 300 checks whether a trouble ticket associated with the correlation rule exists. If the ticket exists, the method proceeds to step 332 to append the new event to the trouble ticket even if the original ticket was for a different asset. If the ticket does not exist, the method proceeds to step 360 to determine whether the user desires to have the ticket created automatically.

In step 360, method 300 determines whether a trouble ticket should be created for the correlation rule automatically. If a new ticket is not needed, the method proceeds to step 368. If a new ticket is needed, it proceeds to step 362 to create the ticket.

In step 362, a trouble ticket is created for the first trigger event. The other events (if any) will be appended to the ticket. The method then proceeds to step 364 to associate the ticket with an asset.

In step 364, the trouble ticket is associated with the asset of the initial trigger event. Note that other events are appended to the ticket for the correlation rule even if the ticket is for a different asset.

In step 366, the trouble ticket is marked with the name of the correlation rule that matches it from the list created in step 316 of the current method. The method proceeds to step 368 to monitor open tickets.

In step 368, method 300 determines whether there is an open ticket or if there is at least one open triplicate associated with the correlation rule. If there is an open ticket or an open triplicate, the correlation rule is kept open. If the ticket is closed and if there is no open triplicate, the method proceeds to step 380 to close the correlation rule. It should be noted that an open triplicate is defined as a triplicate where there is still time remaining in the time constraint field.

In step 380, method 300 closes the correlation rule. Method 300 ends in step 390.

Figure 6:
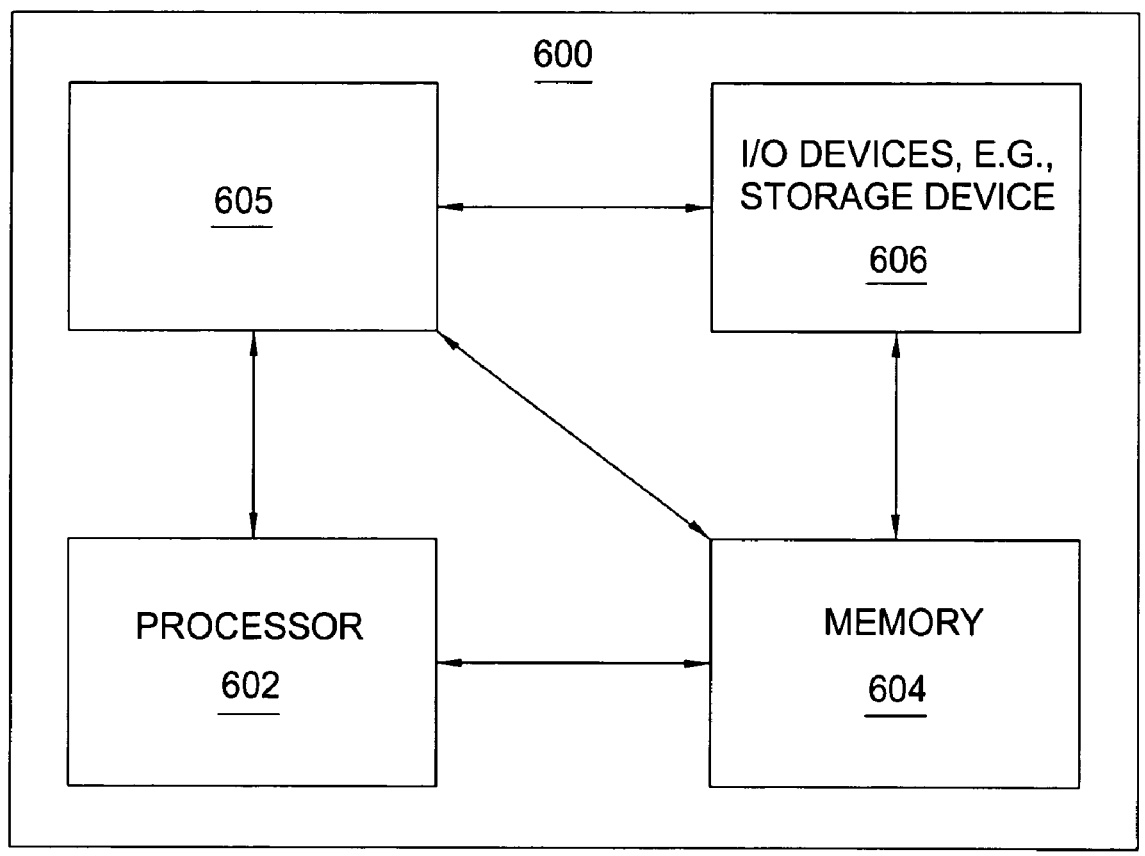
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), event correlator module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present event correlator module or process 605 can be loaded into memory 604 and executed by processor 602 to implement the functions as discussed above. As such, the present event correlator method 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for correlating events in a communication network, comprising:

receiving a new event;

matching said new event to an event class of at least one correlation rule;

determining whether said new event correlates to an open instance of said at least one correlation rule;

correlating automatically via a processor said new event to a previous event if said new event correlates to an open instance of said at least one correlation rule;

assigning a new trigger event if said new event fails to correlate to an open instance of said at least one correlation rule;

generating at least one event condition for said new event, wherein said at least one event condition comprises at least one triplicate, where each of said at least one triplicate comprises an event class field, an asset field and a time constraint field, wherein said determining comprises:

comparing said at least one triplicate of said new event with at least one existing triplicate of said open instance of said at least one correlation rule; and updating said at least one existing triplicate with said at least one triplicate of said new event; or adding said at least one triplicate of said new event to said at least one existing triplicate.

2. The method of claim 1, wherein said at least one correlation rule is an event correlation table.

3. The method of claim 1, wherein at least one topological relationship of said at least one correlation rule is derived from a topological database.

4. The method of claim 3, wherein a plurality of assets in said topological database is relationally defined in terms of at least one of: connected-to and contains.

5. The method of claim 4, wherein said at least one topological relationship of said at least one correlation rule is derived from said topological database only once.

6. The method of claim 1, further comprising:

generating at least one trouble ticket associated with said new event.

7. The method of claim 1, further comprising:

closing said open instance of said at least one correlation rule if a trouble ticket associated with said at least one correlation rule is closed and if all event conditions associated with said at least one correlation rule are closed.

8. A computer-readable storage medium having stored thereon a plurality of instructions, the plurality of instructions including instructions which, when executed by a processor, cause the processor to perform steps of a method for correlating events in a communication network, comprising:

receiving a new event;

matching said new event to an event class of at least one correlation rule;

determining whether said new event correlates to an open instance of said at least one correlation rule;

correlating automatically via a processor said new event to a previous event if said new event correlates to an open instance of said at least one correlation rule;

assigning a new trigger event if said new event fails to correlate to an open instance of said at least one correlation rule;

generating at least one event condition for said new event, wherein said at least one event condition comprises at least one triplicate, where each of said at least one triplicate comprises an event class field, an asset field and a time constraint field, wherein said determining comprises:

comparing said at least one triplicate of said new event with at least one existing triplicate of said open instance of said at least one correlation rule; and updating said at least one existing triplicate with said at least one triplicate of said new event; or adding said at least one triplicate of said new event to said at least one existing triplicate.

9. The computer-readable storage medium of claim 8, wherein said at least one correlation rule is an event correlation table.

10. The computer-readable storage medium of claim 8, wherein at least one topological relationship of said at least one correlation rule is derived from a topological database.

11. The computer-readable storage medium of claim 10, wherein a plurality of assets in said topological database is relationally defined in terms of at least one of: connected-to and contains.

12. The computer-readable storage medium of claim 11, wherein said at least one topological relationship of said at least one correlation rule is derived from said topological database only once.

13. The computer-readable storage medium of claim 8, further comprising:

generating at least one trouble ticket associated with said new event.

14. The computer-readable storage medium of claim 8 further comprising:

closing said open instance of said at least one correlation rule if a trouble ticket associated with said at least one correlation rule is closed and if all event conditions associated with said at least one correlation rule are closed.

15. An apparatus including at least one processor for correlating events in a communication network, comprising:

means for receiving a new event;

means for matching said new event to an event class of at least one correlation rule;

means for determining whether said new event correlates to an open instance of said at least one correlation rule;

means for correlating said new event to a previous event if said new event correlates to an open instance of said at least one correlation rule;

means for assigning a new trigger event if said new event fails to correlate to an open instance of said at least one correlation rule;

means for generating at least one event condition for said new event, wherein said at least one event condition comprises at least one triplicate, where each of said at least one triplicate comprises an event class field, an asset field and a time constraint field, wherein said means for determining compares said at least one triplicate of said new event with at least one existing triplicate of said open instance of said at least one correlation rule; and means for updating said at least one existing triplicate with said at least one triplicate of said new event; or means for adding said at least one triplicate of said new event to said at least one existing triplicate.

* * * * *